United States Patent [19]
Nowara et al.

[11] Patent Number: 5,799,038
[45] Date of Patent: Aug. 25, 1998

[54] METHOD FOR MEASURING MODULATION PARAMETERS OF DIGITAL QUADRATURE-MODULATED SIGNAL

[75] Inventors: Kenji Nowara, Okegawa; Juichi Nakada, Kumagaya, both of Japan

[73] Assignee: Advantest Corporation, Tokyo, Japan

[21] Appl. No.: 847,597

[22] Filed: Apr. 25, 1997

[30] Foreign Application Priority Data

| Apr. 30, 1996 | [JP] | Japan | 8-109323 |
| May 10, 1996 | [JP] | Japan | 8-116169 |
| May 17, 1996 | [JP] | Japan | 8-123295 |
| Jul. 8, 1996 | [JP] | Japan | 8-177605 |

[51] Int. Cl.$^6$ .................................................. H04B 3/46
[52] U.S. Cl. ...................... 375/224; 375/226; 375/324; 370/203; 370/208; 455/67.1
[58] Field of Search .......................... 375/224, 226, 375/205, 206, 261, 269, 340, 343; 455/67.1, 67.3, 67.6, 115, 226.1; 370/203, 206, 208; 371/3, 4.1, 42

[56] References Cited

U.S. PATENT DOCUMENTS

| 5,001,724 | 3/1991 | Birgenheier et al. | 375/226 |
| 5,187,719 | 2/1993 | Birgenheier et al. | 375/226 |
| 5,692,009 | 11/1997 | Iijima | 375/226 |
| 5,732,105 | 7/1995 | Andren et al. | 375/226 |

Primary Examiner—Wellington Chin
Assistant Examiner—Congvan Tran
Attorney, Agent, or Firm—Staas & Halsey

[57] ABSTRACT

The signal to be measured is converted into digital form and read into a memory 13 using a trigger as the reference, and a signal of a length ⅕ that of the signal to be measured, in the vicinity of the trigger, is orthogonal-transformed (14). A frequency error $\omega_1$ of the transformed output $I_1, Q_1$ is estimated (15) and is used to correct the output $I_1, Q_1$ (16). The corrected output $I_2, Q_2$ is subjected to processing by a receiving filter (17), and the filtered output $I_3, Q_3$ is synchronized with a PN code to obtain an ideal signal $R_I, R_Q$ and a phase difference $\tau_1$ is calculated. The signal $I_3, Q_3$ and the ideal signal $R_I, R_Q$ are used to obtain a frequency error $\omega_2$ and a phase error $\tau_2$ of the signal $I_3, Q_3$. All signals to be measured, stored in the memory 13, are subjected to orthogonal transformation (23) so that the frequency error $\omega_1 + \omega_2$ and the phase error $\tau_1 + \tau_2$ are removed, and the transformed output $I_5, Q_5$ and the signal $R_I, R_Q$ are used to calculate modulation parameters as is the case with the prior art.

19 Claims, 4 Drawing Sheets

METHOD FOR MEASURING MODULATION PARAMETERS OF DIGITAL QUADRATURE-MODULATED SIGNAL

BACKGROUND OF THE INVENTION

The present invention relates to a method for measuring modulation parameters of the transmitted signal quadrature-modulated by a preknown code (data), such as a carrier frequency error, the modulation accuracy, an IQ origin offset, an amplitude error, a phase error, the waveform quality and a time alignment error, as is the case with the transmitted signal from a base station defined by, for example, the standard of CDMA (Code division Multiple Access) digital mobile communications (EIA/TIA/IS-95 Mobile Station.Base Station Compatibility Standard for Dual-Mode Wideband Spread Spectrum Cellular System, which will hereinafter be referred to as IS-95 standard).

The output signal from a conventional transmitter of the QPSK modulation system needs to be demodulated accurately on a bitwise basis. On this account, criterion for assessment by the standard are rigid and the output signal from the actual transmitter to be measured is also a relatively clean signal of a waveform not seriously distorted or disturbed, that is, an easy-to-demodulate signal. Since the signal of the system of the IS-95 standard is a spread spectrum signal, however, it is not required to be demodulated accurately bit by bit. That is, the QPSK signal presents no problem even if it is a signal of a distorted or disturbed waveform such that a bit error arises when it is demodulated after quadrature detection. Hence, it is necessary that a parameter measuring method for determining the waveform quality of the transmitted signal from the base station, which meets the IS-95 standard specifications, be able to determine the waveform quality even if the waveform is distorted or disturbed more than in the case of the QPSK modulated signal.

In view of the above, $\rho$ is defined by the IS-95 standard as a waveform quality parameter, not as the modulation accuracy. The parameter $\rho$ is obtained by normalizing the value of correlation between the modulated high-frequency signal from the transmitter and an ideal modulated signal by their powers. When the both signal match, the parameter $\rho$ assumes the maximum value 1.

In the CDMA system the coincidence of timing among base stations in the communication system is indispensable because of the property of the spread spectrum signal. As regards the transmitted signal from the base station, it is necessary that the timing for sending the high-frequency signal coincide with certain timing of the standard time in that base station. The tolerance of this timing is also standardized by the IS-95 standard. This timing is defined by the difference between a trigger that is sent from the base station and specific timing of a PN pattern of the high-frequency signal transmitted from that base station. This trigger is sent at the beginning of the PN pattern period in the standard time in the base station. This timing error is called a time alignment error.

The CDMA signal is spread by a high spreading chip rate rather than by the transmission bit rate. Hence, in the assessment of a modulated signal of a duration corresponding to transmission bits of the same number as that of the bits subject to assessment in the conventional standard for measuring the modulation accuracy of the QPSK modulated signal, the number of chips will be appreciably large even if the duration is the same. In the conventional scheme for measuring the modulation accuracy of the QPSK modulated signal using the chip number as the symbol number, the number of symbols to be measured is large and the computing time is long accordingly. By the way, in RDRSTD-28 that is the PHS standard in our country, a signal of a 1-burst-600-μS period is subject to assessment and the symbol rate in this case is around 200 kHz, whereas in IS-95 the chip rate is approximately 1.2 MHz. If a signal of the 600-μS period is subject to assessment as in the case of the PHS standard, the number of symbols to be estimated will become about six-fold.

In the measurement of the waveform quality, it is standardized that the transmitted signal to be measured is applied to a complementary filter to eliminate intersymbol interference that is caused by a filter and a transmitting phase equalizer at the transmitting side.

To this end, the complementary filter is defined to provide a Nyquist filter characteristic when the sending filter, the transmitting phase equalizer and the complementary filter are connected in cascade (connected in series).

In the CDMA system the use of such a complementary filter characteristic in a filter at the receiving side provides the optimum receiving characteristic. Consequently, this complementary filter serves as a receiving filter of the measuring apparatus.

The complementary filter serves as a narrow band-pass filter for the high-frequency signal but a low-pass filter for the base band signal. In the measurement of the waveform quality, processing by this filter is carried out in accordance with the carrier frequency of the input signal, but in this instance, if the carrier frequency is not accurate, there is a fear of the input signal being partly cut out because the filter is narrow-band.

Further, the receiving filter is equipped with group delay frequency characteristics that cancel those of the transmitted signal. On this account, it is necessary in the measurement of the waveform quality, too, to measure the timing (phase) of the input signal after the filter processing. In this case, a major or serious error arises in the timing measurement unless the carrier frequency is accurately estimated.

Conventionally, this filter processing is repeated a number of times to repeat the estimation of the carrier frequency as disclosed in the specification of U.S. Pat. No. 5,187,719 (issued Feb. 16, 1993), especially in FIG. 15 and the associated disclosure. The timing (phase) of the input signal is estimated only once prior to the filter processing since the traditional receiving filter has flat group delay frequency characteristics. Thus, the waveform quality measuring method using the receiving filter is also required to reduce the computing time.

In the measurement of the waveform quality standardized by the IS-95 standard, it is necessary to synchronize the spreading code of the measuring apparatus with the spreading code of the input spread spectrum signal.

One of channels for the transmitted signal from the base station of the IS-95 standard is called a pilot channel. The signal of the pilot channel is a signal QPSK-modulated by PN codes of in-phase and quadrature components (I) and (Q). The PN codes of the in-phase and quadrature components (I) and (Q) are called gold codes and their cross correlation is appreciably low.

To synchronize the spreading code of the measuring apparatus with the spreading code of the pilot signal, it is customary in the prior art to convert or transform the input pilot signal into a sequence of digital values, with the sampling frequency set eight times higher than the chip frequency of the spreading code (PN code) of the pilot signal, i.e. a quadruple oversampling. Since the spreading codes are synchronized by calculating the correlation between them while shifting the spreading code generator sample by sample, the correlating operation is appreciably time-consuming.

In the measurement of each of the afore-mentioned parameters, its symbol timing must be estimated. Conventionally, the symbol timing is estimated using an M-phase (M being an integer equal to or greater than 2) PSK complex base band signal derived from the input spread spectrum signal and demodulated data (phase data) demodulated from the complex base band signal. This will be described below with reference to FIG. 1.

For example, a QPSK complex base band signal r(t) is input via an input terminal 111 into a sampling circuit 112 and a differentiation circuit 113. In the sampling circuit 112 the signal r(t) is sampled by the oscillation output from a voltage-controlled clock (VCC) generator 114 and the output from the differentiation circuit 114 is also sampled by the output from the voltage-controlled clock generator 114 in a sampling circuit 120. The sampled outputs from the sampling circuits 112 and 120 are fed to multipliers 115 and 116, wherein they are multiplied by an ideal signal (a reference signal) exp(−jθk) (θk being a k-th phase of demodulated data) from a signal generator 117. These multiplied outputs, that is, deviations from ideal data, are added together by cumulative adders (integrators) 118 and 119; namely, they are averaged. The outputs from the cumulative adders 118 and 119 are multiplied by a multiplier 121 to detect a deviation from ideal symbol timing and its real part is detected by a circuit 122. The detected output is used to control the clock signal from the voltage-control led clock (VCC) generator 114, putting the output from the VCC 114 into synchronization with the symbol timing.

A brief description will be given of the estimation of the symbol timing of the QPSK complex base band signal by the maximum likelihood estimation method heretofore employed although this is disclosed in "Digital Communications," Proakis McGraw-Hill.

In the first place, a logarithmic likelihood function $\Lambda_L$ ($\phi,\tau$) can be set as follows:

$$\Lambda_L(\phi,\tau)=Re[\exp(-j\phi)\int r(t)R^*(t-\tau)dt] $$

where r(t) is the received signal (complex base band signal), R(t) is a reference signal, $\tau$ is a time lag, $\phi$ is the initial phase of the carrier, T is the measuring time, $\int$ is an integration from 0 to T and * is a complex conjugate. In the maximum likelihood method, the time lag $\tau$ is calculated so that the logarithmic likelihood function $\Lambda_L(\phi,\tau)$ becomes maximum.

That is, $\phi$ that satisfies the following equations is eliminated and the equations are solved on $\tau$.

$$\partial \Lambda_L/\partial \phi=0 \quad \partial \Lambda_L/\partial \tau=0$$

From the above equations $\tau$ is calculated to satisfy the following equation.

$$Re[Z(\tau)\cdot(\partial Z^*(\tau)/\partial \tau)]=0 \quad (1)$$

where $$Z(\tau)=\int r(t)R^*(t-\tau)dt \quad (2)$$

where $\int$ indicates an integration from 0 to T and $$R^*(t-\tau)=\Sigma g(t-\tau-kT_c)\exp(-j\theta_k) \quad (3)$$

In the above, g(t) is an impulse response characteristic of a Nyquist filter (g(t)=0 for |MT$_s$|>0), $\theta_k$ is the k-th phase of demodulated data, $T_c$ is the chip interval, $T_s$ is the sampling period and $\Sigma$ is the summation from k=0 to a value corresponding to T. Substituting them into Eq. (1) gives $$Re[Z(\tau)\cdot \partial Z^*(\tau)/\partial \tau]=Re[\Sigma\{\exp(-j\theta k)\cdot Y_k(\tau)\}\cdot \Sigma\{\exp(-j\theta k)\partial Y_k(\tau)/\partial \tau\}]=0 \quad (4)$$

where $$Y_k(t)=\int r(t)g(t-\tau-kT_c)dt \quad (5)$$

In the above, $\int$ is an integration from 0 to T.

That is, $\Sigma\{\exp(-j\theta k)\cdot Y_k(\tau)\}$ corresponds to the output from the circuit 118 in FIG. 1 and $\Sigma\{\exp(-j\theta k)\partial Y_k(\tau)/\partial \tau\}$ corresponds to the output from the circuit 119. The VCC 114 is controlled so that the real part of the products of these outputs is reduced to zero, and the sampling timing of each of the sampling circuits 112 and 120 is estimated from the symbol timing of the input QPSK complex base band signal.

The configuration of FIG. 1 is to estimate the symbol timing by the maximum likelihood estimation method.

The FIG. 1 configuration is formed by hardware, and in the case of implementing it by software, no highly accurate solution could be obtained because the input signal is a discrete time signal. To obtain the solution with high accuracy, the sampling rate (the sampling speed) must be increased—this inevitably increases the amount of processing by an interpolation filter and hence increases the processing time.

In the estimation of the carrier frequency in the conventional parameter measurements, in the case of a four-phase (n=4) PSK signal, that is, in the case of the QPSK signal, the intermediate-frequency (or high-frequency) QPSK signal in the digital form is raised to the fourth power to thereby remove the modulated signal. That is, the QPSK signal assumes any one of four phase points sequentially displaced π/2 apart in accordance with the modulated signal, so that by raising the QPSK signal to the fourth power, any phase states become integral multiples of 2π and the modulated signal is removed.

The signal thus raised to the fourth power is subjected to fast Fourier transform, then a frequency component that provides the maximum peak is extracted from the result of the Fourier transform and frequency divided down to ¼, and the frequency of this divided output is estimated as the carrier frequency of the input QPSK signal. This estimated frequency is used to convert or transform the input QPSK signal to a complex base band signal through Hilbert transformation or orthogonal detection, besides the estimated frequency is used to estimate the deviation of the QPSK signal from the standard carrier frequency.

The input QPSK signal is a digital signal, and if its sampling frequency $f_s$ does not satisfy a condition $2f_m<f_s$ with respect to the maximum frequency $f_m$ of the QPSK signal, aliasing occurs and original information cannot be retained.

Since the QPSK signal is raised to the fourth power, its maximum frequency is four-fold, that is, $4f_m$. If the sampling theorem is not satisfied in this instance, aliasing occurs and the carrier frequency cannot accurately be estimated.

It is therefore an object of the present invention to provide a method with which it is possible to correctly measure modulation parameters of the input signal even if it is prone to produce a demodulation error.

Another object of the present invention is to provide a method which permits accurate measurement of modulation parameters of the input signal with a small computational complexity and in a short time.

Another object of the present invention is to provide a method which enables modulation parameters of the input signal to be measured by a signal of a shorter duration.

Another object of the present invention is to provide a modulation parameter measuring method which permits rapid synchronization of a spreading code with the input signal.

Another object of the present invention is to provide a modulation parameter measuring method which enables symbol timing to be estimated by software in a short time.

Still another object of the present invention is to provide a modulation parameter measuring method which permits an accurate estimation of the carrier frequency.

SUMMARY OF THE INVENTION

According to the present invention, a input digital quadrature-modulated signal is subjected to orthogonal transformation to a first complex base band signal In a first step. In a second step a frequency error, an initial phase error and a timing error of the first complex base band signal are estimated and an ideal reference signal is calculated which is synchronized with the first complex base band signal. In a third step the input digital quadrature-modulated signal is subjected to orthogonal transformation to a second complex base band signal so that the frequency error, the initial phase error and the timing error are corrected. In a fourth step a frequency error and an initial phase error of the second complex base band signal is estimated from the second complex base band signal and the ideal reference signal. In a fifth step the estimated frequency error and the initial phase error of the second complex base band signal is corrected to provide a third complex base band signal. In a sixth step a modulation parameter is estimated from the third complex base band signal and the ideal reference signal.

In a seventh step the frequency error of the first complex base band signal estimated in the second step is corrected to provide a fourth complex base band signal, which is subjected to processing by a receiving filter or complementary filter to obtain a fifth complex base band signal. In an eighth step the above-mentioned ideal reference signal is generated which has its symbol synchronized with that of the fifth complex base band signal, and an initial phase error of the first complex base band signal is estimated from the phase difference between the ideal reference signal and the first complex base band signal.

In a ninth step a frequency error and an initial phase error of the fifth complex base band signal are estimated from the fifth complex base band signal and the ideal reference signal. The sum of the frequency errors estimated in the seventh and ninth steps is the frequency error estimated in the second step, and the sum of the initial phase errors estimated in the eighth and ninth steps is the initial phase error estimated in the second step.

In the second step, symbol decision points of quadrature modulation are estimated from the first complex base band signal sequence, then samples near the estimated symbol decision points are extracted from the first complex base band signal sequence, and the correlation between the extracted samples and spreading codes is calculated. In this instance, the correlation calculation is conducted only for the real part (in-phase component) or imaginary part (quadrature component) in the first complex base band signal sequence.

In the estimation of the symbol decision points, the cross correlation between the first complex base band signal and demodulated data is calculated, then the cross correlation is subjected to filter processing using three Nyquist filter characteristics approximated as functions of symbol timing τ, respectively, and the results of these filter processing are used to calculate the symbol timing.

In the second step, the first complex base band signal is raised to the n-th power, then the signal raised to the n-th power is subjected to discrete Fourier transform, and the maximum peak component is extracted from the result of transform. The frequency of the maximum peak component is divided down to 1/n, and the divided frequency and the standard carrier frequency of the input n-phase PSK signal are added together to estimate the carrier frequency of the input signal. n is an integer equal to or greater than 2 and usually satisfies $n=2^m$ (where $m=1, 2, \ldots$).

DESCRIPTION OF THE PREFERRED EMBODIMENT

Figure 2:
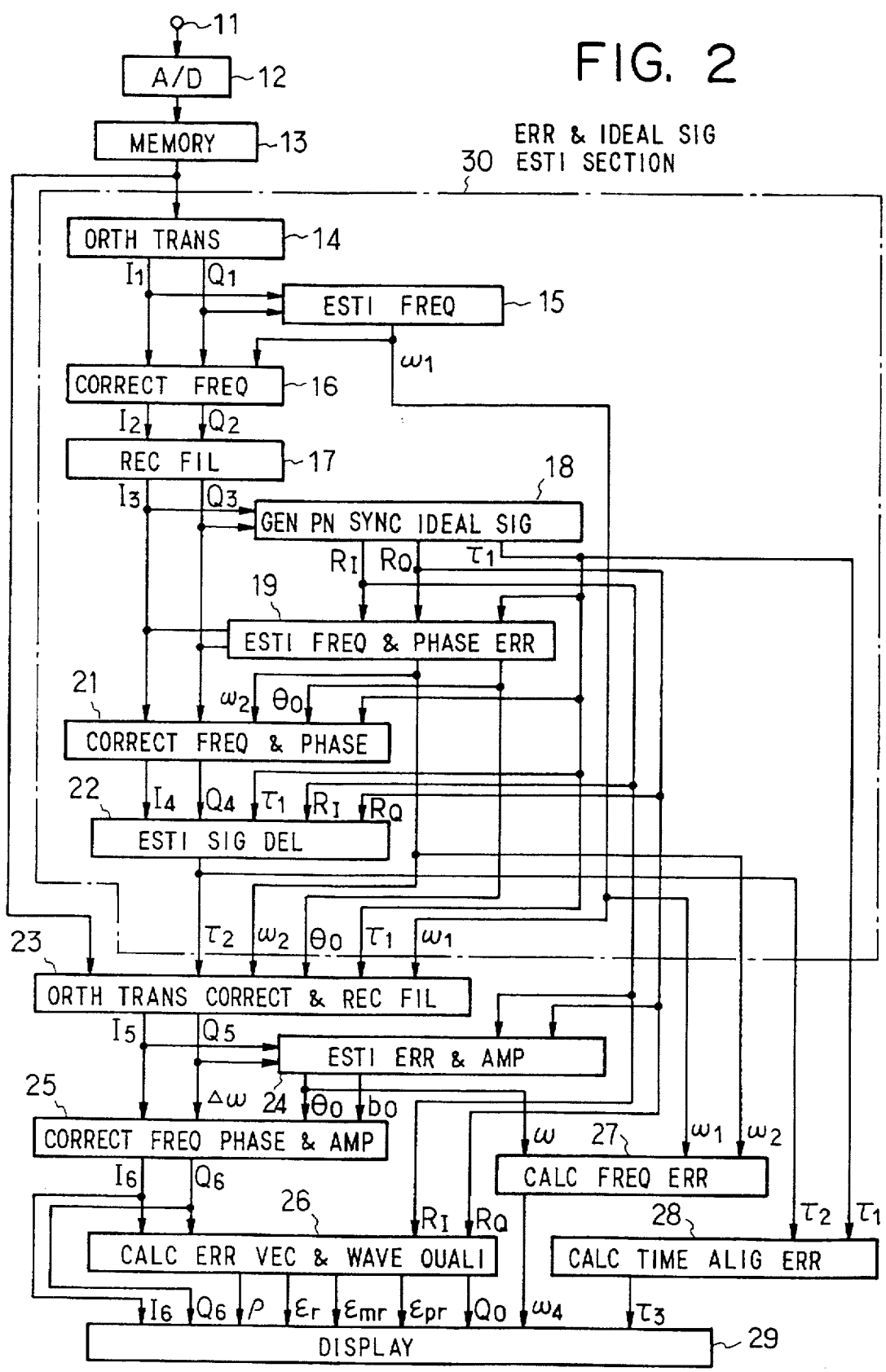
FIG. 2 is a block diagram illustrating the functional configuration of a measuring apparatus employing the method for measuring modulation parameters of a digital quadrature-modulated signal according to the present invention.

In FIG. 2 there is illustrated the functional configuration of the measuring apparatus according to an embodiment of the present invention. This embodiment shows an application of the invention to the measurement of quality parameters of a pilot signal that is transmitted from a base station in the CDMA digital cellular telephone system. The I component of the pilot signal is a QPSK-modulated version of the carrier by certain PN pattern data and the Q component a QPSK-modulated version of the carrier by another PN pattern data. The pair of such PN patterns is called a gold code, and the cross correlation between the two PN patterns is uniformly low without scattering.

The pilot signal (hereinafter referred to as a BS pilot signal) transmitted from the afore-mentioned CDMA base station is converted to an intermediate-frequency signal, which is input via an input terminal 11 into an AD converter 12, wherein it is converted to a digital signal, and the digital signal of the period to be measured is once stored in a memory 13. The sampling frequency in the AD converter 12 is set to be eight times higher than the chip frequency of a spreading PN pattern of the BS pilot signal. The memory 13 is a ring buffer, which is designed so that when a write or read reaches the last address, it starts again at the address 0.

and the write in the memory, an address increment and write halting are controlled by a trigger signal that is fed from the outside. That is, the digital signals that are written into the memory 13 are before and after the trigger signal. Some of the stored contents of the memory 13, for example, signals of at least 2048 samples (in terms of the chip number, ⅛, i.e. about 400 samples) are read out before and after the trigger signal. In this instance, the number of samples of the digital signal is significantly smaller than the data length of the period for measurement defined by the standard and it is not clear whether the data is that in the period, but it is true that the data is that neighboring the beginning of the PN period. The signal thus read out of the memory 13 is fed to an orthogonal transform section 14, wherein it is subjected to orthogonal transform (orthogonal detection) to a first complex base band signal $I_1, Q_1$ through multiplication by $\sin \omega t$ and $\cos \omega t$.

Figure 3:
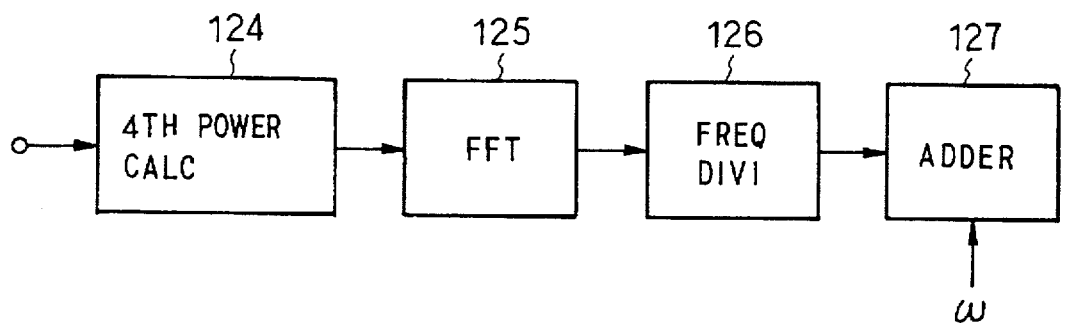
FIG. 3 is a block diagram showing the functional configuration of a frequency estimating section 15 in FIG. 2.

The first complex base band signal $I_1, Q_1$ is fed from the orthogonal transform section 14 to a frequency estimating section 15, wherein a carrier frequency error of the input signal is estimated. The input signal is a QPSK signal that assumes four phase states, and its carrier frequency is obtained by such a method as shown in FIG. 3. That is, the first complex base band signal is raised to the fourth power in a fourth power calculating section 124 to degenerate the modulated component to obtain one phase state, then the signal raised to the fourth power is subjected to fast Fourier transform by an FFT section 125, and that frequency in the FFT output at which the maximum peak is obtained is frequency divided down to ¼ in a frequency dividing section 126 and the standard frequency of the CDMA digital cellular telephone system is added to the frequency-divided output in an adder section 127 to obtain the carrier frequency. The sampling rate of the first complex base band signal is 4.9152 MHz, four times higher than the chip rate, the number of FFT points in the FFT section 125 is 1024, frequency resolution is 4.8 kHz and the frequency estimation accuracy is ±2.4 kHz. The output frequency of the frequency dividing section 126 represents a deviation from the carrier frequency defined by the standard, i.e. an estimated frequency error. Since the data used for the estimation of the frequency error is data neighboring the beginning of the PN period, even if it is displaced from the period to be actually measured, the carrier frequency or timing error does not change in a short time in the transmitter, and hence it is regarded as the carrier frequency error in the measuring period.

The thus estimated frequency error $\omega_1$ is used to correct the first complex base band signal $I_1, Q_1$ in a frequency correcting section 16 (FIG. 2). This correction is made by the following calculation.

$$I_2 + jQ_2 = (I_1 + jQ_1) \exp(-j\omega_1 t)$$

The thus corrected complex base band signal $I_2, Q_2$ is subjected to delay complementary filtering in a receiving filter 17. That is, in the base station the signal to be transmitted therefrom is subjected to filter processing so, that it has a characteristic which will cancel the group delay frequency characteristics in the mobile station to which the signal is to be transmitted. For this reason, the receiving filter 17 cancels the group delay frequency characteristics of the filter in the base station.

Figure 4:
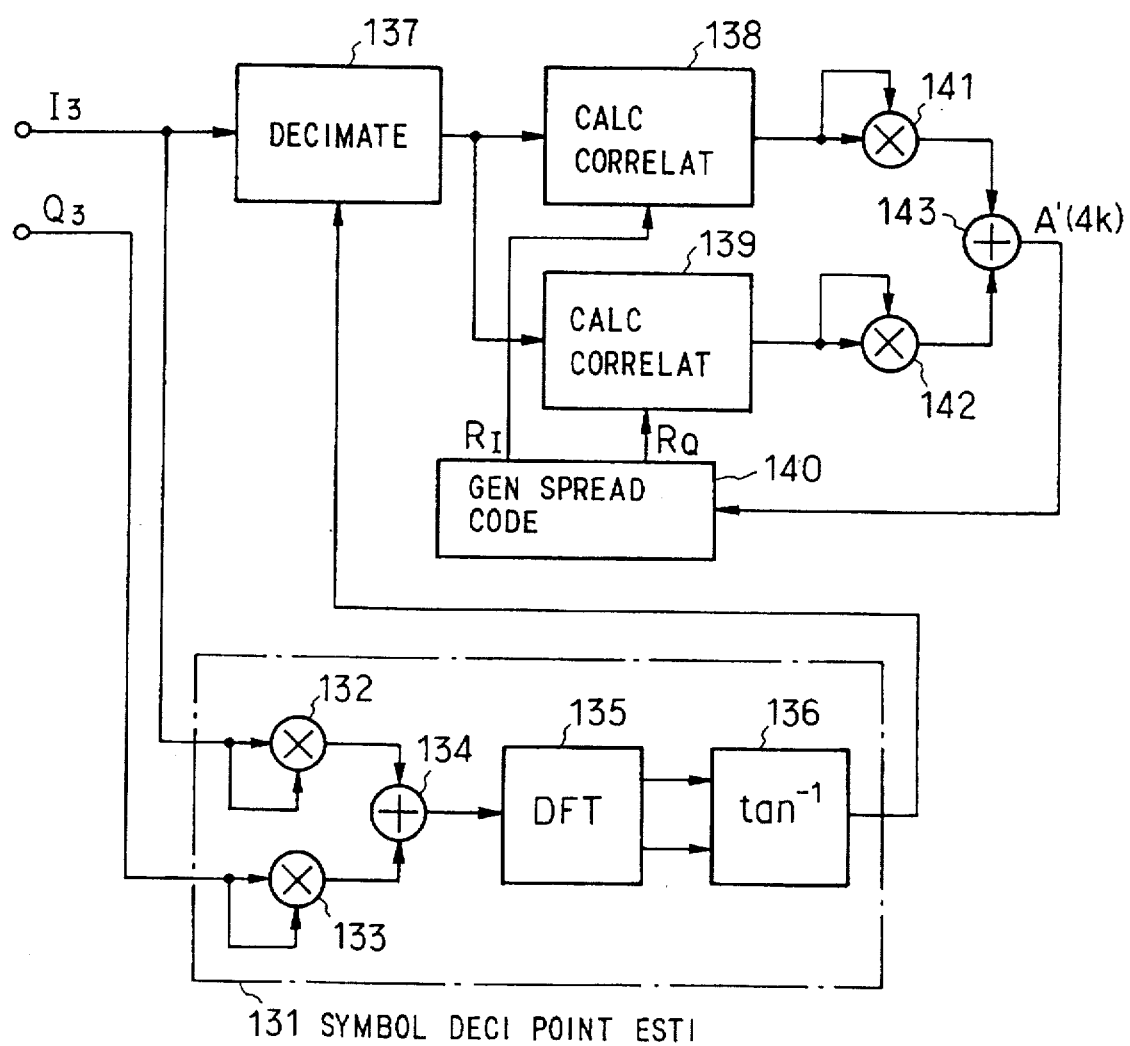
FIG. 4 is a block diagram showing the functional configuration of a PN synchronized ideal signal generating section 18 in FIG. 2.

The filtered complex base band signal $I_3, Q_3$ is provided to a PN synchronized ideal signal generator section 18, wherein it is synchronized with a locally generated PN pattern. Prior to the synchronization, symbol decision points are estimated. The synchronization of the entire sampling data (in this example, the number of samples is eight times as large as that of one chip) with the PN pattern data inevitably increases the computing time. To avoid this, in-phase and quadrature PN codes are used to pre-estimate symbol decision points of the QPSK modulation and only sample points closest to the symbol decision points, that is, data every eight samples, are synchronized with the PN pattern data. The symbol decision points are estimated as described below. As shown in FIG. 4, the in-phase and quadrature components of the corrected complex base band signal $I_3(k), Q_3(k)$ is squared in multiplier sections 132 and 133, respectively, and the squared outputs are added together in an adder section 134 to obtain an amplitude squared sequence of the complex base band signal $I_3(k), Q_3(k)$, which is subjected to discrete Fourier transform in a discrete Fourier transform section 135. A symbol (chip) frequency component in the transformed output is extracted and the arctangent of the extracted component is calculated in an arctangent section 136. From the arctangent output a sequence of zeroes is extracted, and the zeroes are alternately separated into two sequences, the one of which is estimated as a sequence of symbol decision points.

In the above example the sampling frequency of the complex base band signal sequence is chosen to be eight times higher than the chip frequency. In this instance, a sequence of $I_3(k)^2 + Q_3(k)^2$ is multiplied by eight cosine values, for example, 1, 0.707, 0, −0.707, −1, −0.707, 0 and 0.707 in a sequential order and a sequence of $I_1(k)^2 + Q_1(k)^2$ is similarly multiplied by eight sine values one after another. By this, the chip frequency component is obtained which is the result of the discrete Fourier transform.

Figure 5A:
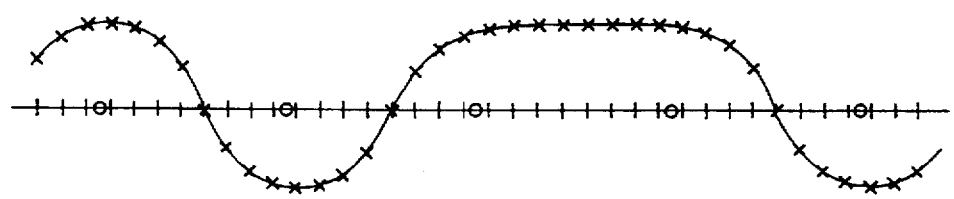
FIGS. 5A and 5B are diagrams for explaining the operation of the section 18 shown in FIG. 4.
Figure 5B:
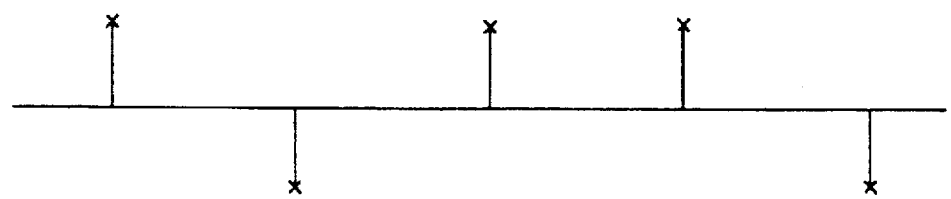

The samples near the chip decision points estimated in a symbol decision estimating section 131 are decimated in a decimating section 137 from the real part (the in-phase component) $I_3(k)$ in the complex base band signal sequence. Assuming that samples in the sequence of the real part $I_3(k)$ are at the positions indicated by crosses x in FIG. 5A and the estimated symbol decision points at the positions indicated by white circles o, that one of the samples at the positions x which are closest to each position o is taken out as shown in FIG. 5B. In the case where the sampling frequency is chosen to be an integral multiple of the symbol frequency, once the difference between a first symbol decision point and the sample point corresponding thereto is determined, it is enough to take out the subsequent samples at intervals of $4T_s$ (where $T_s$ is the sampling period). The correlations between a sample sequence $I_3(4k)$ of the real part $I_3(k)$ near the first symbol decision point and spreading codes $R_I(4k)$ and $R_Q(4k)$ from a spreading code generating section 140 are calculated in correlation calculating sections 138 and 139. The results of the calculations are squared in multiplier sections 141 and 142, and the squared outputs are added together in an adder section 143. As the result of this, a correlation value A'(4k) between the real part $I_3(k)$ and the spreading codes $R_I(4k)$ and $R_Q(4k)$ is provided from the adder section 143. The phases of the spreading codes that are generated in the spreading code generating section 140 are shifted chip by chip so that the correlation value A'(4k) becomes maximum. When the correlation value A'(4k) becomes maximum, the spreading codes $R_I(4k)$ and $R_Q(4k)$ are synchronized with the input $I_3(4k)$. Incidentally, the calculation of the correlation value A'(4k) needs only to be conducted over ±100 chips of the real part $I_3(k)$.

In the above-mentioned pilot signal, the correlation between the in-phase and quadrature PN codes is uniformly low, so that even if the phase of the complex base band signal is not correct, correct synchronization could be accomplished by synchronizing only the in-phase PN code with the complex base band signal. Hence, the spreading codes $R_I(4k)$ and $R_Q(4k)$ may also be similarly synchronized with the imaginary part $Q_3(4k)$ in place of the real part $I_3(4k)$.

In a different case, for example, in the case of synchronizing the PN codes with a spread spectrum signal obtained by spreading the QPSK modulated signal by a spreading code, it is necessary only to calculate complex correlations between $I_3(4k)$, $Q_3(4k)$ and $R_I(4k)$, $R_Q(4k)$. In this instance, too, since the calculation for correlation is conducted at intervals of the symbol sequence ($4T_s$ in the above example), the computational quantity for calculating the correlation is smaller than in the case of calculating at intervals of the sample period. This estimation can be made with accuracy in the symbol decision estimating section 131 by inputting again the data $I_3(4k)$ and $Q_3(4k)$ near the symbol decision points once estimated into the symbol decision estimating section 131 to estimate the symbol decision points in the same manner as described above.

By the PN synchronization described above, the ideal signals $R_I, R_Q$ can be generated.

Turning back to FIG. 2, the ideal signal $R_I, R_Q$ thus produced in the PN synchronized ideal signal generating section 18 and the measured signal (complex base band signal subjected to filter processing) $I_3, Q_3$ is compared in a frequency and phase error estimating section 19 to estimate a carrier frequency error and an initial phase of the input signal and the phase difference between the ideal and measured signals at each of their corresponding symbol decision points is also calculated. If the phase difference exists, it linearly increases with the lapse of time. That is, representing time on the abscissa and the phase difference on the ordinate, the phase difference is a linear function of time and its intercept or segment, that is, the phase difference at time 0 is the initial phase and the inclination to the time axis is the carrier frequency error. Letting the sample number and the phase difference be represented by x and y, respectively, the inclination b of a phase difference line by the least squares method is given by the following equation.

$$b = (\Sigma y_i \cdot \Sigma x_i - n\Sigma x_i y_i)/(\Sigma x_i \cdot \Sigma x_i - n\Sigma x_i^2)$$

where $\Sigma$ indicates the summation from i=1 to n and $x_i$ is the sample number (time). Hence, representing $x_i$ by i, the above equation becomes as follows:

$$b = (\Sigma y_i \cdot \Sigma i - n\Sigma i \cdot y_i)/(\Sigma i \cdot \Sigma i - n\Sigma i^2)$$

where $\Sigma$ indicates the summation from i=1 to n, $\Sigma i = n(n+1)/2$, and $\Sigma i^2 = n(n+1)(2N+1)/6$.

According to the definition of the carrier frequency calculation, a positive frequency error exists when the phase rotation is clockwise on the IQ plane, and since the direction of the sign of the inclination b is positive, the sign is reversed. The inclination b is regarded as a carrier frequency error $\omega_2$. The initial phase is made more accurate by deriving it from the above-mentioned intercept or segment, but the initial value of the phase difference is used because the estimation needed in this case may be rough.

The initial phase $\theta_0$ and the carrier frequency error $\omega_2$ thus obtained are used to correct the filtered base band signal $I_3, Q_3$ by the following equation in a frequency and phase correcting section 21.

$$I_4 + jQ_4 = (I_3 + jQ_3)\exp(j\omega_2 t + \theta_0)$$

Next, the amount of delay of signal is estimated in a signal delay estimating section 22. The amount of delay of the PN pattern behind the trigger is already known and the sampling point closest to the symbol decision point is also known. The signal delay estimating section 22 estimates the signal delay $\tau_2$ in such a manner as described below. The delay $\tau_2$ can be estimated by calculating the parameter clock phase $\tau$, the carrier phase $\phi$ and the carrier frequency f so that the logarithmic likelihood function given by the following equations is maximized.

$$\Lambda(\phi, f, \tau) = \text{Const.}\{\exp(-j\phi)C(f,\tau) + \exp(j\phi)C^*(f,\tau)\} \tag{1}$$

$$C(f,\tau) = \int^{T_O}_0 Z(t)\exp(-2j\pi ft)R^*(t-\tau)dt \tag{2}$$

where Z(t) is the measured signal, R(t) is the reference signal and $T_o$ is the measuring time for estimating the parameters.

The continuous signal R(t) and the discrete signal R(k) bear the following relationship.

$$R(t) = R(kT_s)$$

where $T_s$ is the sampling period.

The principle of estimation similar to that by Eqs. (1) and (2) is disclosed, for example, in Proaks, "Digital Communication," 2nd ed., pp. 333, Eqs. (4, 5, 71), McGrow-Hill, 1989. More specifically, the following simultaneous equations, in which equations differentiated by the respective parameters are set at zeros, are solved for the parameters $\phi$, f and $\tau$.

$$\exp(-j\phi)C(f,\tau) - \exp(j\phi)C^*(f,\tau) = 0 \tag{3}$$

$$\exp(-j\phi)\partial C/\partial \tau + \exp(j\phi)\partial C^*/\partial \tau = 0 \tag{4}$$

$$\exp(-j\phi)\partial C/\partial f + \exp(j\phi)\partial C^*/\partial f = 0 \tag{5}$$

By simultaneously solving these equations, they can be modified to the following simultaneous equations without $\phi$.

$$\partial |C(f,\tau)|^2/\partial \tau = 0 \tag{6}$$

$$\partial |C(f,\tau)|^2/\partial f = 0 \tag{7}$$

From Eq. (6) $\tau$ is calculated setting f=0. Concrete steps of the above calculations will be described below.

In the first place, C(0, t) is expressed with the integration replaced by the summation as follows:

$$C(0,\tau) = T_s \Sigma Z(kT_s) \cdot R^*(kT_s - \tau) \tag{8}$$

where $\Sigma$ indicates the summation from k=0 to K−1 and $T_s = T_c/8$, $T_c$ being the chip period. The measuring time $T_O = KT_s$. The continuous signal R(t) is expressed by the phase $\theta_n$ of the ninth chip as follows:

$$R(t) = \Sigma \exp(j\theta_n) \cdot s(t - nTc) \tag{9}$$

where $\Sigma$ indicates the summation from n=−∞ to ∞ and s(t) is the characteristic of the base band filter. In practice, the summation of Eq. (9) must be effected in a finite or limited period. To this end, the base band filter is assumed to be zero-phase and to have a response time $T_F$. That is, $$s(t)=0 (|t|>T_s/2) \tag{10}$$

In this case, the ideal signal can be expressed as follows:

$$R(kT_s-\tau)=\Sigma_n \exp(j\theta_n)s(\{8n-k\}T_s+a) \tag{11}$$

Then, using Eq. (11), Eq. (8) can be expressed by the following equation by the use of the discrete signals $Z(k)$ and $R(k)$.

$$C(0,\tau) = T_S \sum_{m=-M}^{M} \sum_n Z(\{8n-m\}T_s)\exp(-j\theta n)s(mT_S+\tau) \tag{12}$$

Letting $T_F=(2M+1)T_s$, and the measuring time be represented by $KT_s$ ($k=0$ to $K-1$), the $\theta_n$ must be measured for a time $n=-M/8$ to $(K+M-1)/8$. Next, $s_m(\tau)=s(mT_s+\tau)$ is approximated by a quadratic expression of $\tau$ as follows:

$$S_m(\tau)=a_m+b_m\tau+c_m\tau^2 \tag{13}$$

However, since $\tau$ to be estimated is within the range of $|\tau|<T_s/2$, the approximation needs only to be accomplished within this range. Using this, $C(0, \tau)$ is given by the following equation.

$$C(0,\tau) = T_s \sum_{m=-M}^{M} \sum_n Z(\{8n-m\}T_S)\exp(-j\theta_n)(a_m+b_m\tau+c_m\tau^2)$$

$$= T_s(A+B\tau+C\tau^2) \tag{15}$$

A, B and C in the above are given by the following equations.

$$A = \sum_m \sum_n Z(\{8n-m\}T_s)\exp(-j\theta_n)a_m \tag{16}$$

$$B = \sum_m \sum_n Z(\{8n-m\}T_s)\exp(-j\theta_n)b_m \tag{17}$$

$$C = \sum_m \sum_n Z(\{8n-m\}T_s)\exp(-j\theta_n)c_m \tag{18}$$

Substitution of Eq. (15) into Eq. (6) gives the following equation for $\tau$.

$$Re[C(0,\tau)\partial C^*(0,\tau)/\partial \tau]=(T_s)^2 Re[(A+B\tau+C\tau^2)(B^*+2C^*\tau)]=0 \tag{19}$$

This is a cubic equation for $\tau$, but if a linear approximation is used on the assumption that $\tau$ is small, an equation for calculating the clock phase $\tau$ is given as follows:

$$\tau=-Re[AB^*]/(|B|^2+2Re[AC^*]) \tag{20}$$

This $\tau$ is the afore-mentioned $\tau_2$.

Figure 6:
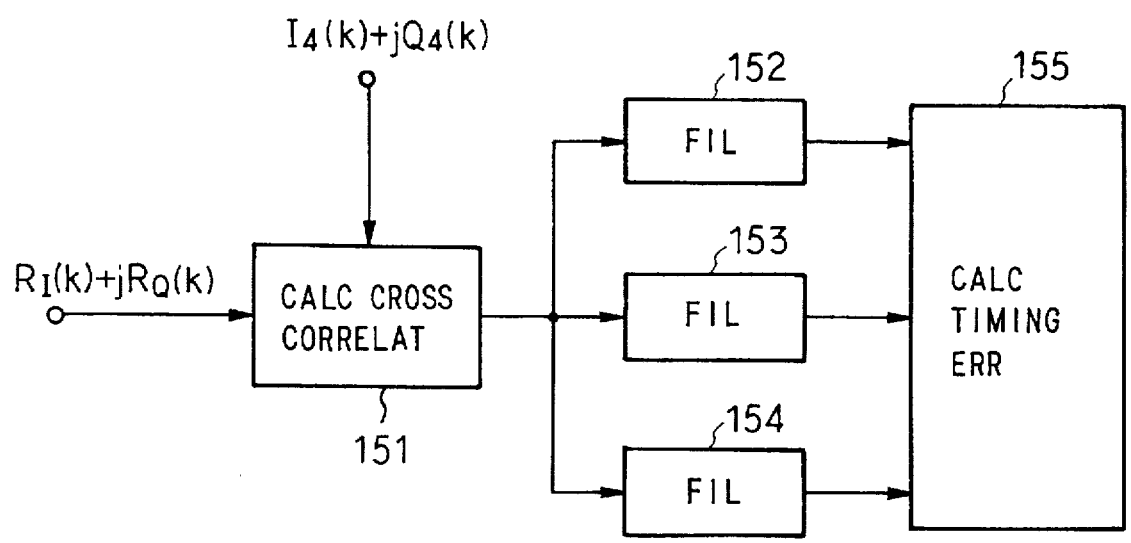
FIG. 6 is a block diagram illustrating the functional configuration of a signal delay estimating section 22 in FIG. 2.

That is, as shown in FIG. 6, the cross correlation between the ideal reference signal $R_I(8k)+jR_Q(8k)$ and the measured signal $I_4(k)+jQ_4(k)$ is calculated in a cross correlation calculating section 151, then the calculated result is filtered by filters 152, 153 and 154 of filter coefficients $a_m$, $b_m$ and $c_m$, respectively, to conduct the calculations of Eqs. (16), (17) and (18) to obtain A, B and C, which are input into a timing error calculating section 155 to calculate Eq. (20) to obtain the timing error $\tau_2$. The filter coefficients $a_m$, $b_m$ and $c_m$ are calculated, for example, as described below. To prevent intersymbol interference in the Nyquist filter, the time from the peak of its impulse response to the first zero point needs to be $T_c$ (the symbol period, in this example, the chip period). Letting a roll-off coefficient be represented by $\alpha$, the impulse response of this filter is given as follows:

$$S(t) = \frac{\sin(\pi t/T_c)}{(\pi t/T_c)} \cdot \frac{\cos(\pi \alpha t/T_c)}{1-(2\alpha t/T_c)}$$

This impulse response is approximated by Eq. (13) to obtain the filter coefficients $a_m$, $b_m$ and $c_m$ at that time.

In an orthogonal transform, frequency, phase, $\tau$ correction and receiving filter section 23, the parameters estimated so far, that is, the carrier frequency error, the initial phase and the signal delay $\tau$, are used to perform orthogonal transformation of all the intermediate-frequency digital signals to be measured, stored in the memory 13, by which is obtained a complex base band signal $I_5,Q_5$ having errors eliminated therefrom and processed by the receiving filter. That is, the signal by which the signal read out of the memory 13 is multiplied is a signal obtained by subtracting the carrier frequency error from the frequency of a locally generated intermediate-frequency signal and correcting its initial phase. In other words, this signal is $\exp(-j(\omega-\omega_1-\omega_2)-\theta$ (where $\theta$ is the phase corresponding to $\tau_1+\tau_2+\theta_0$). In this instance, the initial phase is the sum of the phase corresponding to the time that is the sum of a deviation $\tau_1$ from the symbol decision point and a deviation $\tau_2$ from the pilot PN pattern and an error of the initial phase $\theta_0$ by the carrier frequency error. The low-pass filter for transforming the signal read out of the memory 13 to the base band signal has the same characteristic as that of the receiving filter (a complementary filter). The data to be measured starting at the beginning of the PN code has a length corresponding to 64 by 20 chips in this example.

Then, an error vector is calculated from the complex base band signal $I_5,Q_5$ thus orthogonal-transformed so as to correct the frequency error and so forth and the error vector is used to calculate modulation accuracy, amplitude accuracy, phase error and IQ origin offset. Sufficient accuracy for the calculation of the waveform quality $\rho$ can be obtained with the base band signal $I_5,Q_5$ but amplitude and initial phase errors are important for the calculation of the modulation accuracy. Hence, the amplitude error, the initial phase and the carrier frequency error are estimated from the complex base band signal $I_5,Q_5$ in a manner to meet a modulation accuracy computing standard, and these estimated parameters are used to correct the complex base band signal $I_5,Q_5$, followed by the calculation of the modulation accuracy and other parameters.

That is to say, these parameters are estimated for the base band signal $I_5,Q_5$ in a frequency error, phase and amplitude estimating section 24. Letting the number of the signal data sequence be represented by k, the amplitude of the ideal signal $R_I,Q_I$ by I, the amplitude and phase components of the base band signal $I_5,Q_5$ by $a(k)$ and $\theta(k)$ and the phase component and the amplitude of the ideal signal $R_I,Q_I$ by $\theta_R(k)$ and $a_R(k)$, a carrier frequency error $\Delta\omega$, the initial phase $\theta_0$ and an amplitude coefficient $b_0$ are calculated by the following equations.

$$\Delta\omega = \{(\Sigma a(k) \cdot [\theta(k) - \theta_R(k)]) \cdot (\Sigma a(k) \cdot k) - (\Sigma a(k)) \cdot$$

$$(\Sigma a(k) \cdot [\theta(k) - \theta_R(k)] \cdot k)\}/\{(\Sigma a(k))^2 - (\Sigma a(k)) \cdot (\Sigma a(k) \cdot k^2)\}$$

$$\theta_0 = \{(\Sigma a(k) \cdot k) \cdot (\Sigma a(k) \cdot [\theta(k) - \theta_R(k)] \cdot k) - (\Sigma a(k)) \cdot$$

$$[\theta(k) - \theta_R(k)]) \cdot (\Sigma a(k))/\{(\Sigma a(k) \cdot k)^2 - (\Sigma a(k)) \cdot (\Sigma a(k) \cdot k^2)\}$$

$$b_0 = \{\Sigma a(k) \cdot a_R(k) \cdot \cos[\theta_R(k) - \theta(k) + \Delta\omega \cdot k + \theta_0]\}/\Sigma a(k)^2$$

where $\Sigma$ indicates the summation from 1 of k to the last k (=N) of the input signal.

These calculated values $\Delta\omega$, $\theta_0$ and $b_0$ are used to correct the input complex base band signal $I_5, Q_5$ by the following equation in a frequency, phase amplitude correcting section 25.

$$I_6 + jQ_6 = b_0(I_5 + jQ_5)\exp(-j(\Delta\omega \cdot k + \theta_0))$$

The thus corrected base band signal $I_6, Q_6$ and the ideal signal $R_I, Q_I$ are used to conduct the following equation in an error vector and waveform quality $\rho$ calculating section 26.

In the first place, squares of the amplitude of the error vector at symbol points (every chip period) are all added together by the following equation.

$$\Sigma|e(k)|^2 = \Sigma[(I_6(k) - R_I(k))^2 + (Q_6(k) - R_Q(k))^2]$$

where $\Sigma$ indicates the summation from k=1 to N.

This value is divided by the number N of additions and the square root of the divided value is computed, followed by calculating the following equation to express it as a percentage with respect to the amplitude of the ideal signal.

$$\epsilon_r = 100 \times \sqrt{(\Sigma|e(k)|^2/N)} \quad \% \text{ rms}$$

Next, to obtain the IQ origin offset, added values of the error vector in the I- and Q-axis directions are calculated by the following equations.

$$\Sigma\epsilon_I(k) = \Sigma(I(k) - R_I(k))$$

$$\Sigma\epsilon_Q(k) = \Sigma(I(k) - R_Q(k))$$

where $\Sigma$ indicates the summation from k=1 to N.

The added value in each axis is divided by the number N of additions to obtain the mean value, which is converted to a dB value. Since the amplitude of the ideal signal is 1, letting the amplitude be represented by 0 dB, the IQ origin offset is given by the following equation.

$$O_0 = 20 \times \log_{10}\{\sqrt{(\Sigma\epsilon_I(k))^2 + (\Sigma\epsilon_Q(k))^2}/N^2\}$$

Next, the amplitude error is calculated. This begins with subtracting the amplitude 1 of the ideal signal from the amplitude of the measured signal $I_6, Q_6$, followed by squaring the remainder.

$$\Sigma\epsilon_m(k)^2 = \Sigma(\sqrt{(I_6^2(k) + Q_6^2(k))} - 1)^2$$

where $\Sigma$ indicates the summation from k=1 to N. This is converted by the following equation to the % rms unit to compute the amplitude error.

$$\epsilon_{mr} = 100 \times \sqrt{(\Sigma\epsilon_m^2(k)/N)}$$

After this, the phase error is calculated. In this instance, the phase of the ideal signal $R_I, R_Q$ is subtracted from the phase of the measured signal $I_6, Q_6$ and the remainder is squared. In this subtraction of phase, the phase difference may sometimes be calculated in the opposite direction when the phase is near the 180° axis; so that the phase difference is corrected when it is larger than 180°.

$$\Sigma\epsilon_p^2(k) = \Sigma(\arctan(Q(k)/I(k)) - \theta_R(k))^2$$

where $\Sigma$ indicates the summation from k=1 to N. This is converted by the following equation to a unit deg rms.

$$\epsilon_{pr} = (180/\pi) \times \sqrt{(\Sigma\epsilon_p^2(k)/N)}$$

The waveform quality $\rho$ is calculated by the following equations based on its definition.

$$Re(j) = \Sigma(I_6(k) \cdot R_R(k) + Q_6(k) \cdot R_Q(k))$$

$$Im(j) = \Sigma(Q_6(k) \cdot R_R(k) - I_6(k) \cdot R_Q(k))$$

where $\Sigma$ indicates the summation from k=1+64(j−1) to 64+64(j−1).

$$\rho = \Sigma(Re(j) \cdot Re(j) + Im(j) \cdot Im(j))/[64 \cdot \Sigma(I_6^2(k) + Q_6^2(k))]$$

where $\Sigma$ in the denominator indicates the summation from k=1 to 64N and $\Sigma$ in the numerator the summation from k=1 to N.

The frequency error $\omega_1$ estimated in the frequency estimating section 15, the frequency error $\omega_2$ in the frequency error and phase estimating section 19 and the frequency error $\Delta\omega$ in the frequency error, phase and amplitude estimating section 24 are added together in a common unit in a frequency error calculating section 27 to obtain a frequency error $\omega_4$.

From the PN synchronized ideal signal generating section 18 a difference $\tau_1$ between the trigger from the base station and the beginning of the PN code sequence of the received input signal is obtained, which is provided to a time alignment error calculating section 28 for addition to a signal delay $\tau_2$ estimated in the signal delay estimating section 22. The difference (½ chip) between reference timing defined by the standard and the symbol decision point and the pre-measured amount of delay by hardware in the measuring system are used to correct the added value $\tau_1 + \tau_2$ to obtain a time alignment error $\tau_3$.

The signal $I_6, Q_6$ and the parameters $\rho$, $\epsilon_r$, $\epsilon_{mr}$, $\epsilon_{pr}$, $O_0$, $\omega_4$ and $\tau_3$ obtained as described above are displayed on a display 29. In an error and ideal signal estimating section 30 made up of the orthogonal transform section 14 through the signal delay estimating section 22 in FIG. 2, a frequency error and a timing error of the input signal and an ideal reference signal are estimated from the input signal whose length is significantly shorter than that of the signal to be measured, for example, about 400 chips (symbols), and the estimated values are used to process the entire input signal to be measured in the processing sections 23 through 26.

While in the above intersymbol interference is eliminated from the input signal in the PN synchronized ideal signal generating section 18, a signal with intersymbol interference or data other than the symbol decision point may sometimes be needed in the case where the modulation system used is not that of the CDMA digital cellular telephone. In such an instance, PN patterns processed by the sending filter are held in a memory. Although the present invention has been described as being applied to the measurement of the waveform quality of the modulated signal of the spread spectrum system, the invention is also applicable to the measurement of the waveform quality of modulated signals of other systems—this can be achieved usually by utilizing a predetermined known word portion such as a synchronization word. In the case of using part of the PN code as transmitted data, the known data can be used in synchronization with the PN code portion. The receiving filter 17 in FIG. 2 may sometimes be omitted.

As described above, according to the present invention, since the ideal reference signal is generated using a known portion of the symbol in the input signal, not from input signal demodulated data, no measurement error will not be caused by a demodulation error. In this respect, the present invention permits effective measurement of modulation parameters of signals prone to introduce demodulation errors.

Further, according to the present invention, the frequency error is relatively easily obtained using a portion of the input signal, for example, about 400 symbols and the frequency error is used to correct the input signal. The ideal reference signal is easily derived from the corrected input signal $I_2,Q_2$ and the ideal reference signal thus obtained and the corrected signal $I_2,Q_2$ are used to obtain frequency and timing (phase) errors relatively easily. Thereafter, the input signal is subjected to orthogonal transformation to obtain a complex base band signal $I_6,Q_6$ so that these errors are removed, and modulation parameters are derived from the complex base band signal and the ideal reference signal $R_I,R_Q$. The computational quantity in the present invention is smaller than in the case of increasing the measurement accuracy by repeating the production of all modulation parameters as in the aforementioned U.S patent.

Repeating the calculation of processed data, there is a fear that calculation errors accumulate, making the calculated value rather inaccurate. According to the present invention, however, the input signal is subjected to orthogonal transformation in the processing section 23 and its output is processed only once; hence, there is no accumulation of calculation errors by repeating calculations.

By obtaining the frequency error, timing error and ideal reference signal with a signal shorter than the input signal to be measured, the computation complexity can be further reduced.

In the case of performing the filter processing, the operation therefor is particularly time-consuming, but the computational complexity needed in the present invention can be reduced far smaller than in the prior art which always uses the entire signal to be measured.

In the embodiment described above, since the frequency error is corrected prior to the receiving filter processing, part of the signal is not cut off by the receiving filter processing, ensuring accurate measurement.

Since the CDMA mobile communication signal is spread by the PN code, if each chip is used as the symbol to be measured in the conventional method, the number of symbols becomes, for example, six-fold except the pilot signal and the computing time for measurement also becomes six-fold. However, the present invention is far smaller in computation complexity as described previously, and hence it is advantageous over the prior art.

According to the present invention, the input n-phase PSK signal is converted to a complex base band signal and it is raised to the n-th power as shown in FIG. 3. Accordingly, the carrier frequency of the complex base band signal is an error frequency of the input n-phase PSK signal, and this is a significantly small value and the sampling frequency of the signal raised to the n-th power satisfies the condition of the sampling theorem without fail, making it possible to obtain the carrier frequency with accuracy.

In the synchronization of the spreading code with the input signal, the symbol decision point is estimated and the correlation is calculated for only samples near the symbol decision point as described previously with reference to FIGS. 4 and 5, the computational complexity required is smaller than in the case of calculating the correlation for every sample. In the case of the pilot signal, in particular, since the correlation with the samples near the symbol decision points is calculated for only the real or imaginary part of the input complex base band signal, the computational complexity is sharply reduced as compared with that in the prior art.

Figure 1:
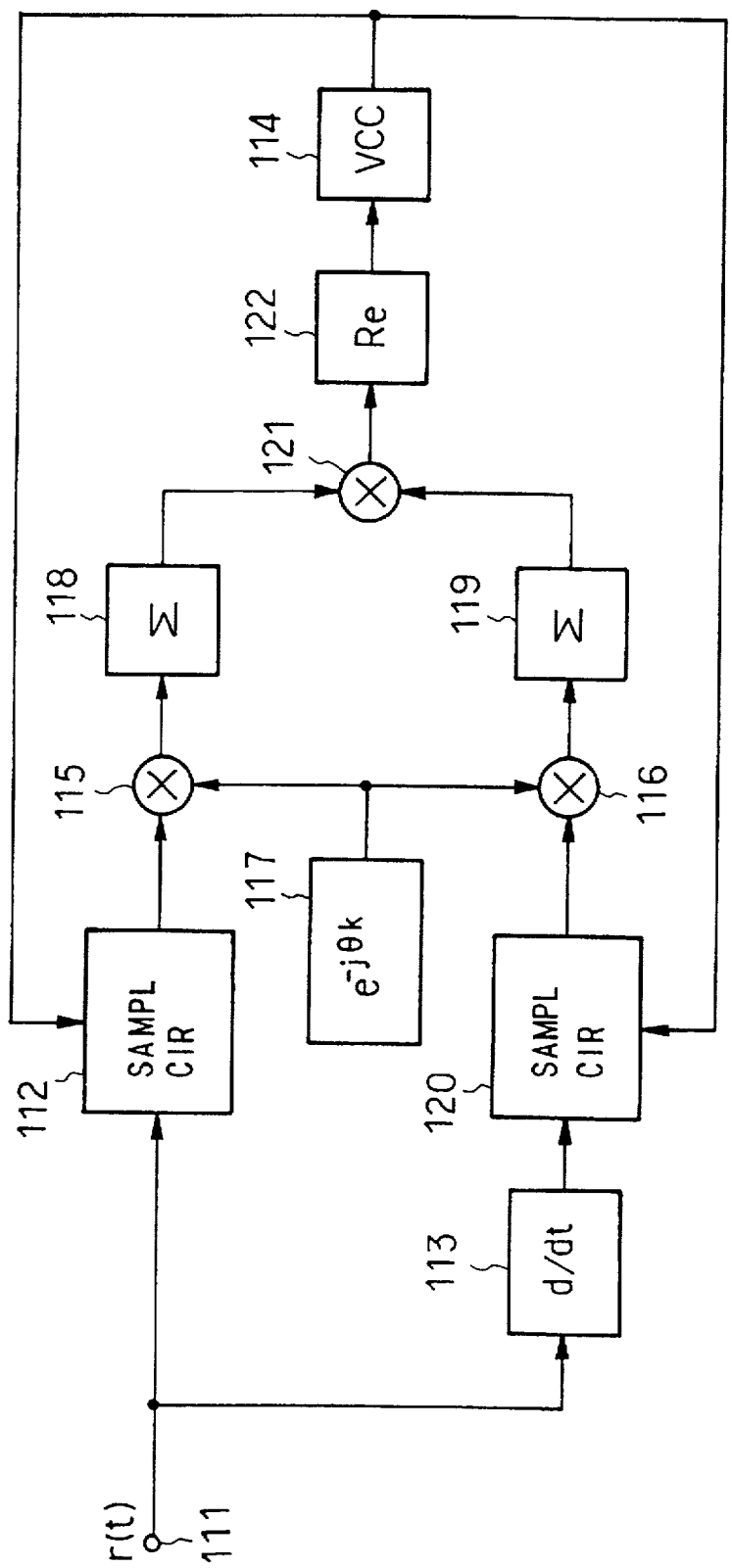
FIG. 1 is a block diagram showing the functional configuration for a conventional symbol timing estimation.

In the operation in the signal delay estimating section 22, that is, in the estimation of the symbol timing, the products A, B and C of the value of cross correlation between the input complex base band signal Z(k) and the ideal signal R(k) and the filter coefficients $a_m$, $b_m$ and $c_m$ are computed as indicated by Eqs. (16), (17) and (18) and $\tau$ is calculated by Eq. (20). Accordingly, the value $\tau$ can be obtained with high accuracy without involving any interpolating operation and hence in a short time (with small computational complexity). In contrast to this, according to the conventional method of FIG. 1, the calculation of the value $\tau$ with high resolution and consequently with high accuracy, requires the reduction of the sampling interval by performing an interpolation operation. That is, the conventional method repeats the calculation while shifting the input signal and the ideal signal relative to each other, and hence it consumes much time for the calculation.

It will be apparent that many modifications and variations may be effected without departing from the scope of the novel concepts of the present invention.

What is claimed is:

1. A modulation parameter measuring method for a digital quadrature-modulated signal, comprising:
    a first step of obtaining a first complex base band signal by orthogonal transformation of part of a digital sequence of an input digital quadrature-modulated signal stored in a memory;
    a second step of estimating a frequency error (hereinafter referred to as a first frequency error), an initial phase error (hereinafter referred to as a first initial phase error) and a timing error (hereinafter referred to as a first timing error) of said first complex base band signal and an ideal reference signal synchronized with a symbol of said first complex base band signal;
    a third step of obtaining a second complex base band signal by orthogonal transformation of a digital sequence of the entire input digital quadrature-modulated signal necessary for measurement stored in said memory in such a manner as to correct said first frequency error, said first initial phase error and said first timing error;
    a fourth step of estimating, from said second complex base band signal and said ideal reference signal, a frequency error (hereinafter referred to as a second frequency error) and an initial-phase error (hereinafter referred to as second initial phase error) of said second complex base band signal;
    a fifth step of correcting said second frequency error and said second initial phase error of said second complex base band signal to obtain a third complex base band signal; and
    a sixth step of estimating a modulation parameter of said input digital quadrature-modulated signal from said third complex base band signal and said ideal reference signal.

2. The method of claim 1, wherein said second step comprises a seventh step of generating said ideal reference signal by using said first complex base band signal, and an eighth step of estimating a frequency error (hereinafter referred to as a third frequency error) and an initial phase error (hereinafter referred to as a third initial phase error) from said first complex base band signal and said ideal reference signal, said third frequency error and said third initial phase error being respectively said first frequency error and said first timing error in said third step.

3. The method of claim 2, wherein said eighth step is a step of calculating said first frequency error by calculating the rate of change of the phase difference between said ideal reference signal and said first complex base band signal with respect to the lapse of time, an initial value of the phase difference between said ideal reference signal and said first complex base band signal being said first initial phase error.

4. The method of claim 2, wherein said seventh step comprises: a symbol decision point estimating step of estimating symbol decision points from said first complex base band signal oversampled with respect to a symbol period; a decimating step of decimating samples close to said estimated symbol decision points from the one of two components of said first complex base band signal; a correlation calculating step of calculating the correlation between said decimated samples and a complex local signal; and a step of obtaining said ideal reference signal by controlling the delay of said complex local signal so that the value of said correlation is maximized.

5. The method of claim 4, wherein said symbol decision point estimating step comprises steps of: calculating the magnitude of each sample of said first complex base band signal; performing discrete Fourier transform processing of a sequence of said magnitudes; and calculating said symbol decision points from the phase of a symbol period component contained in the result of said discrete Fourier transform processing.

6. The method of claim 5, wherein said discrete Fourier transform processing is performed by multiplying said magnitude sequence by instantaneous values of sine and cosine waveforms for each sample period.

7. The method of claim 2, wherein said second step comprises a ninth step of estimating a frequency error (hereinafter referred to as a fourth frequency error) of said first complex base band signal, and a tenth step of correcting said first complex base band signal with said fourth frequency error to obtain said first complex base band signal for use in said seventh step, the sum of said fourth frequency error and said third frequency error obtained in said eighth step being said first frequency error in said third step.

8. The method of claim 7, wherein said ninth step comprises steps of: raising said first complex base band signal of n-phase modulation to the n-th power; performing fast Fourier transform processing of said first complex base band signal raised to the n-th power; and frequency-dividing a frequency component in the output of said fast Fourier transform processing, which provides the maximum peak, down to 1/m to obtain said fourth frequency error.

9. The method of claim 2, wherein said second step comprises an eleventh step of correcting said first complex base band signal with said third frequency error and said third initial phase error, and a twelfth step of calculating a timing error (hereinafter referred to as a second timing error) between said first complex base band signal corrected in said eleventh step and said ideal reference signal, said second timing error being said first timing error in said third step.

10. The method of claim 9, wherein said twelfth step comprises the steps of: calculating the cross correlation between said first complex base band signal corrected in said eleventh step and said ideal reference signal; performing filter processing of said cross correlation by three Nyquist filter characteristics each approximated as a function of said second timing error; and calculating said second timing error from the results of filter processing using said three Nyquist filter characteristics.

11. The method of claim 1, wherein said second step further comprises a thirteen step of a frequency error (hereinafter referred to as a third frequency error) of said first complex base band signal, a fourteenth step of correcting said first complex base band signal with said third frequency error, and a fifteenth step of subjecting said first complex base band signal corrected in said fourteenth step to processing a filter of a predetermined characteristic to obtain said first complex base band signal for use in said second step.

12. The method of claim 11, wherein modulation data of said input digital quadrature-modulated signal is preknown.

13. The method of claim 11, wherein part of said digital sequence is about 400 symbols long.

14. The method of claim 1, which further comprises a sixteenth step of detecting the time difference between a trigger from the outside and said ideal reference signal as a time alignment error, the sum of said first timing error in said second step and said time alignment error being said first timing error in said third step.

15. The method of claim 14, which further comprises the steps of: reading said input digital quadrature-modulated signal into a memory using said trigger as the reference; and detecting, as said time alignment error, the difference between the address of said memory corresponding to said trigger and the address corresponding to the beginning of said ideal reference signal.

16. The method of claim 14, wherein part of sid digital sequence is about 400 symbols long.

17. The method of claim 1, wherein modulation data of said input digital quadrature-modulated signal is preknown.

18. The method of claim 17, wherein said input digital quadrature-modulated signal is a transmitted signal modulated by a pilot PN code in a CDMA mobile communication system.

19. The method claim 18, wherein part of said input digital sequence is about 400 symbols long.

* * * * *